US009507957B2

(12) United States Patent
Ahuja

(10) Patent No.: US 9,507,957 B2
(45) Date of Patent: *Nov. 29, 2016

(54) PROVIDING FEATURES IN A DATABASE SYSTEM ENVIRONMENT

(71) Applicant: salesforce.com, inc., San Francisco, CA (US)

(72) Inventor: Neeraj Ahuja, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,022

(22) Filed: Feb. 29, 2016

(65) Prior Publication Data

US 2016/0180111 A1  Jun. 23, 2016

Related U.S. Application Data

(63) Continuation of application No. 12/949,452, filed on Nov. 18, 2010, now Pat. No. 9,275,160.

(60) Provisional application No. 61/346,892, filed on May 20, 2010.

(51) Int. Cl.
*G06F 17/30* (2006.01)
*G06F 21/62* (2013.01)
*G06Q 30/00* (2012.01)

(52) U.S. Cl.
CPC ....... *G06F 21/6218* (2013.01); *G06F 17/3089* (2013.01); *G06F 17/30368* (2013.01); *G06F 17/30578* (2013.01); *G06F 17/30867* (2013.01); *G06Q 30/00* (2013.01)

(58) Field of Classification Search
CPC .................................................. G06F 17/3089
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

*Primary Examiner* — William Spieler
(74) *Attorney, Agent, or Firm* — Haynes Beffel Wolfeld LLP; Ernest J. Beffel, Jr.

(57) ABSTRACT

A system and method for providing features in a database system. In one embodiment, a method includes receiving, from a user, a request for a feature, where the feature is a functionality of the database system. The method further includes upgrading the database system, where the upgrading includes one or more provisioning steps that are based on the request from the user.

18 Claims, 4 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,463,433 B1 | 10/2002 | Baclawski |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0021535 A1 | 1/2005 | Skow |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2006/0021019 A1 | 1/2006 | Hinton et al. |
| 2007/0271275 A1 | 11/2007 | Fassette et al. |
| 2008/0086482 A1 | 4/2008 | Weissman |
| 2008/0209503 A1* | 8/2008 | Hess .................. G06F 21/10 726/1 |
| 2008/0249972 A1 | 10/2008 | Dillon |
| 2009/0030814 A1 | 1/2009 | Caballero et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

\* cited by examiner

PROVIDING FEATURES IN A DATABASE SYSTEM ENVIRONMENT

CLAIM OF PRIORITY

This application is a continuation of U.S. patent application Ser. No. 12/949,452 entitled, "Performing an Upgrade in a Multi-Tenant Database System Environment," filed Nov. 18, 2010, which claims the benefit of U.S. Provisional Patent Application 61/346,892 entitled, "Methods and Systems for Performing an Upgrade in a Multi-Tenant Database System Environment," filed May 20, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to providing features in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. Every release of a database system may include new features. Each new feature requires particular database upgrades that may be inefficient and inconvenient for users.

BRIEF SUMMARY

Embodiments provide mechanisms and methods for providing features in a database system. In one embodiment, a method includes receiving, from a user, a request for a feature, where the feature is a functionality of the database system. The method further includes upgrading the database system, where the upgrading includes one or more provisioning steps that are based on the request from the user.

While one or more implementations and techniques are described, one or more embodiments may be implemented in a system having an application server providing a front end for an on-demand database service capable of supporting multiple tenants. The embodiments described herein are not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Embodiments described herein may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the embodiments described are not limited to the examples depicted in the figures.

DETAILED DESCRIPTION

General Overview

Systems and methods are provided for providing features in a database system environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for providing features in a database system environment will be described with reference to example embodiments.

System Overview

Embodiments described herein provide features in a database system. In one embodiment, the system receives, from a user, a request for a feature. A feature may be a database functionality that a user wishes to use. For example, the functionality may be quote functionality that enables a user in sales to provide quotes to an end user. In one embodiment, upon receiving the request from the user, the system upgrades the database system, which involves one or more provisioning steps, depending on the request from the user.

The provisioning steps may include, for example, updating a schema layout, running database scripts, updating database scripts, etc. In one embodiment, the system performs the upgrade immediately upon receiving the request. In one embodiment, the system performs the upgrade on a per-user basis for each user from which a request is received.

Figure 1:
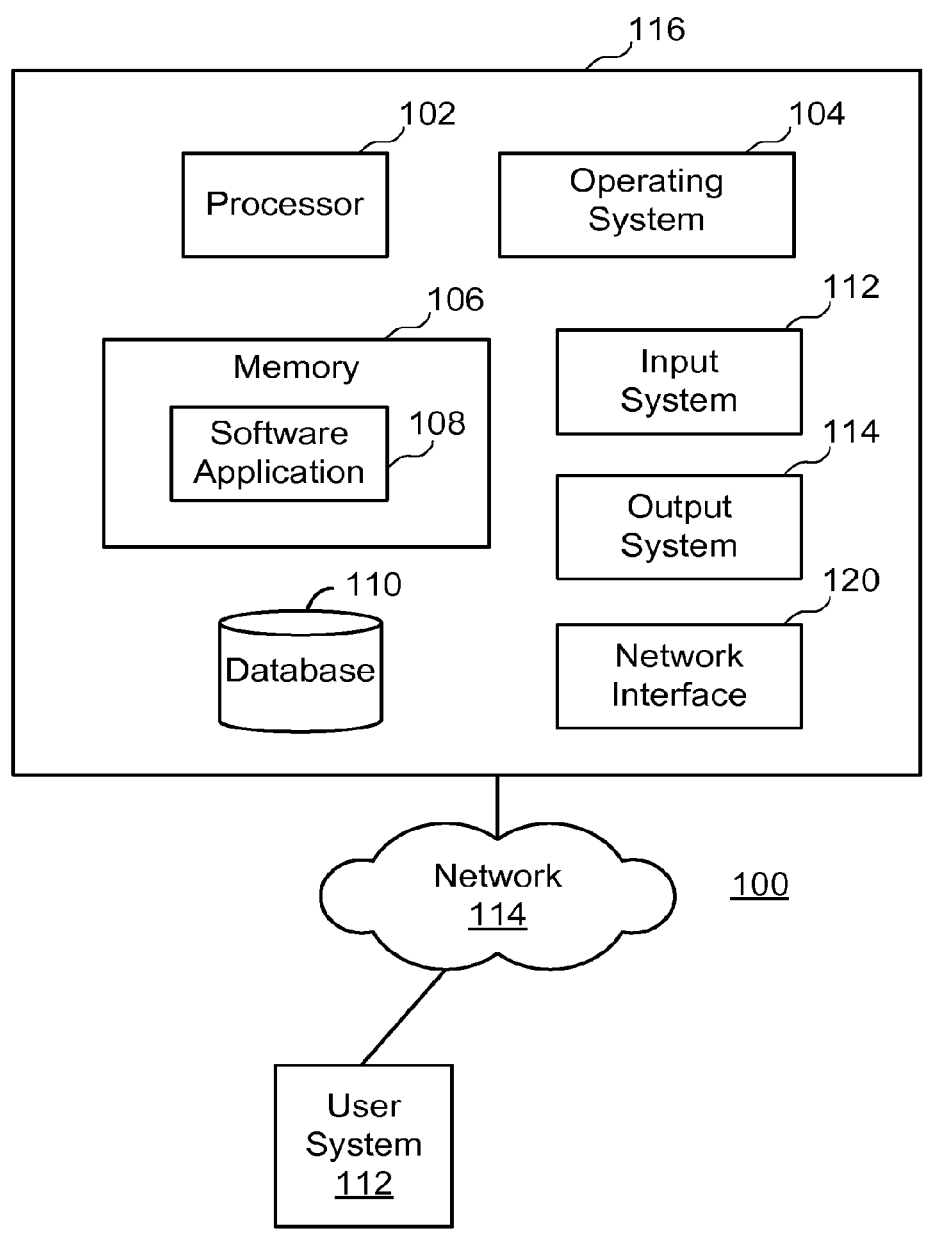
FIG. 1 illustrates a block diagram of an example environment, which may be used to implement the embodiments described herein.

FIG. 1 illustrates a block diagram of an example environment 100, which may be used to implement the embodiments described herein. In one embodiment, environment 100 includes a user system 112, a network 114, and a system 116. In one embodiment, system 116 includes a processor 102, a memory 106, a software application 108, a database 110, an input system 112, an output system 114, and a network interface 120. In other embodiments, environment 100 may not have all of the components listed and/or may have other elements instead of, or in addition to, those listed above.

For ease of illustration, FIG. 1 shows one block for each of user system 112, processor 102, and database 110. These blocks 112, 102, and 110 may represent multiple user systems, processors, and database units.

Figure 2:
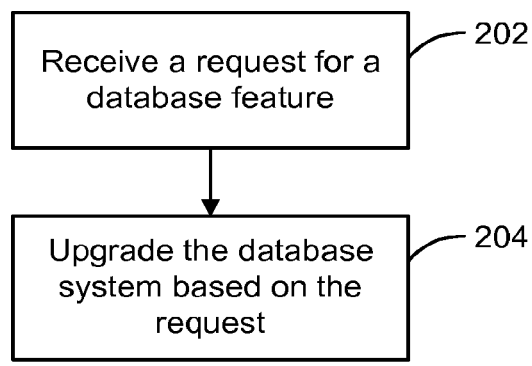
FIG. 2 illustrates an example simplified flow diagram for providing features in a database system, according to one embodiment.

FIG. 2 illustrates an example simplified flow diagram for providing features in a database system, according to one embodiment. Referring to both FIGS. 1 and 2, the method is initiated in block 202, where system 116 receives, from a user, a request for a feature. In one embodiment, a user may represent a particular organization or company. For example, a user may be a customer, agent of a customer or organization, customer administrator, etc.

In one embodiment, a feature may be described as an entity. An entity is an object in the system, where the object provides functionality for the user. As such, the feature may be a functionality of the database system.

While system 116 is described as performing the steps as described in the embodiments herein, any suitable component or combination of components of system 116 or any suitable processor or processors associated with system 116 may perform the steps described. For example, the steps may be performed by processor system 317 or process space 328 of FIG. 3, by system process 402 of FIG. 4, or by any other suitable processor or processors associated with system 116.

In one embodiment, a functionality may be provided by a business entity. One example of a business entity is a quote entity. Users use the quote entity to perform business actions (e.g., provide quotes to their customers). For example, in one embodiment, the customer (e.g., sales person) can use the quote entity to provide a quote to an end customer for a particular item that the end customer may order.

In one embodiment, system 116 provides a user interface through which the user may request one or more features. In one embodiment, to enable a user to make a request for a feature, system 116 may provide a selection of features and corresponding boxes in the user interface. The user may select a feature and request one or more features by checking the corresponding boxes. In one embodiment, a user may select an appropriate button (e.g., okay button, make request button, etc.) in order to initiate sending a request for one or more features to system 116.

In block 204, system 116 upgrades the database system based on the request from the user. In one embodiment, the upgrading includes one or more provisioning steps that are based on the request from the user. In one embodiment, the provisioning steps may depend on the particular user making the request (e.g., permissions associated with the user), may depend on the particular request (e.g., schema update), etc. Examples of provisioning steps are described below.

In one embodiment, system 116 performs the upgrading immediately during system operation upon receiving the request. System 116 need not wait until downtime to perform the upgrades. Because every release of a multi-tenant database system may include new features that require particular database upgrades, immediately performing upgrades (e.g., on-demand upgrades or just-in-time upgrades) to the database system delivers requested features to user in minimal time. This delivers functionality to users much faster than waiting until system downtime to perform upgrades.

Embodiments break of the provisioning into smaller steps, in that the provisioning actions are performed per user instead of for all qualified customers. In other words, in one embodiment, system 116 performs the upgrading on a per-user basis for each user from which a request is received.

Per-user upgrades simplify the upgrade process for a number of reasons. For example, by performing a given upgrade for a given user, any problems that may arise during the upgrade would not affect upgrades associated with requests from other users. Likewise, problems with upgrades associated with other users would not affect the upgrade of the given user. For example, if there is a problem during a particular upgrade for a particular user, there would be no need for a rollback for all upgrades, only for the upgrade for the particular user. In another example, during an upgrade for a given user, there would no concern about time outs related to upgrades for other users. There is thus an overall savings of time and resources.

As indicated above, provisioning actions are needed for each new feature. In one embodiment, with each entity, a set of provisioning actions are needed to support the entity in the existing infrastructure. Example provisioning actions performed include running database scripts, updating database scripts, updating schema layout. Other provisioning actions are possible, and the actual provisioning actions may depend on the particular requesting user and/or the particular entity.

In one embodiment, scripts that system 116 runs are localized. They are already written are stored in an appropriate location. In one embodiment, the scripts are written in java, and java code runs scripts on a per-user basis during system operation.

In one embodiment, the schema layout is how a given entity is viewed on a page, which may include the layout of the fields on the page. In one embodiment, these provisioning tasks may include providing information associated with how the entity is to be viewed on the page for presentation. In one embodiment, these provisioning tasks may include providing information about the layout of the page that displays the entity. In one embodiment, the layout of the page may need the database to be pre-populated, so that once the entity is enabled, particular actions can be automatically performed. In one embodiment, a default layout may be populated with the existing standard profiles for the object, including permissions associated with the profiles.

Another example provisioning action may involve enabling and providing field level security parameters. Such field level security parameters may include items that are associated with a quote, for example, a quote value, a quote contact, a quote discount, whether a particular user may view a quote discount, etc. These are a few examples.

Other updates to the existing database schema may be required. For example, in one embodiment, system 116 may update, provide or process profile information associated with the requesting user. In one embodiment, system 116 may determine permissions for the requesting user. Such permissions may be permissions for standard users who are already in the system, as well as new users. System 116 may associate one or more permissions tables with the user, and these tables may need updating. In one embodiment, system 116 populates existing standard profile permissions for the objects.

In the example above involving the quote entity, an example permission may be what the sales person may do with a quote, what type of sales people's profiles are allowed to create a quote, delete a quote, etc.

The following are other example provisioning actions. In one embodiment, a provisioning action may include enabling the customer to create a piece of information (e.g., a quote), delete the information, provide information about any other information associated with the feature. The provisioning action may enable the presentation of quotes. In one embodiment, a provisioning action may be that system 116 determines licenses and permissions of the user. In one embodiment, a provisioning action may generate a PDF template (e.g., a default PDF template), and populate/seed the PDF template for the end user (e.g., customer). In one embodiment, a provisioning action may generate or retrieve metadata for a given feature.

In addition to a quote feature, other examples of features may include entitlements (e.g., related to service contracts for particular items sold, for a customer entitled to certain services and/or warranties), and email features (e.g., email layouts).

In one embodiment, the following interface provides guidelines for different upgrade actions on how to implement the upgrade actions that are needed to be performed:

```
public interface StandardEntityUpgradeAction {
    public abstract void performUpgradeAction(String
        adminUserId) throws
    SQLException;
}
```

In particular embodiments, this interface may be implemented during some or all provisioning actions. This interface is an example signature, and the actual interface used will depend on the particular implementation.

In particular embodiments, the implementation details for a given upgrade action may be different, depending on the particular requirements for the upgrade actions. The following upgrade actions (some of which are described above) may be implemented using this interface, and could be applied to any new business entity being enabled by system 116: page layout upgrade, business entity create-read-update-delete (CRUD) permissions upgrade, business entity field level security permissions upgrade, and picklist field values upgrade. In one embodiment, each of these implement PerforUpgradAction, and the particular implementation details of each differ as each performs different functions. In one embodiment, this interface could also be extended to perform business case specific upgrade actions by writing upgrade actions that are not generic, but perform a particular desired action.

Figure 3:
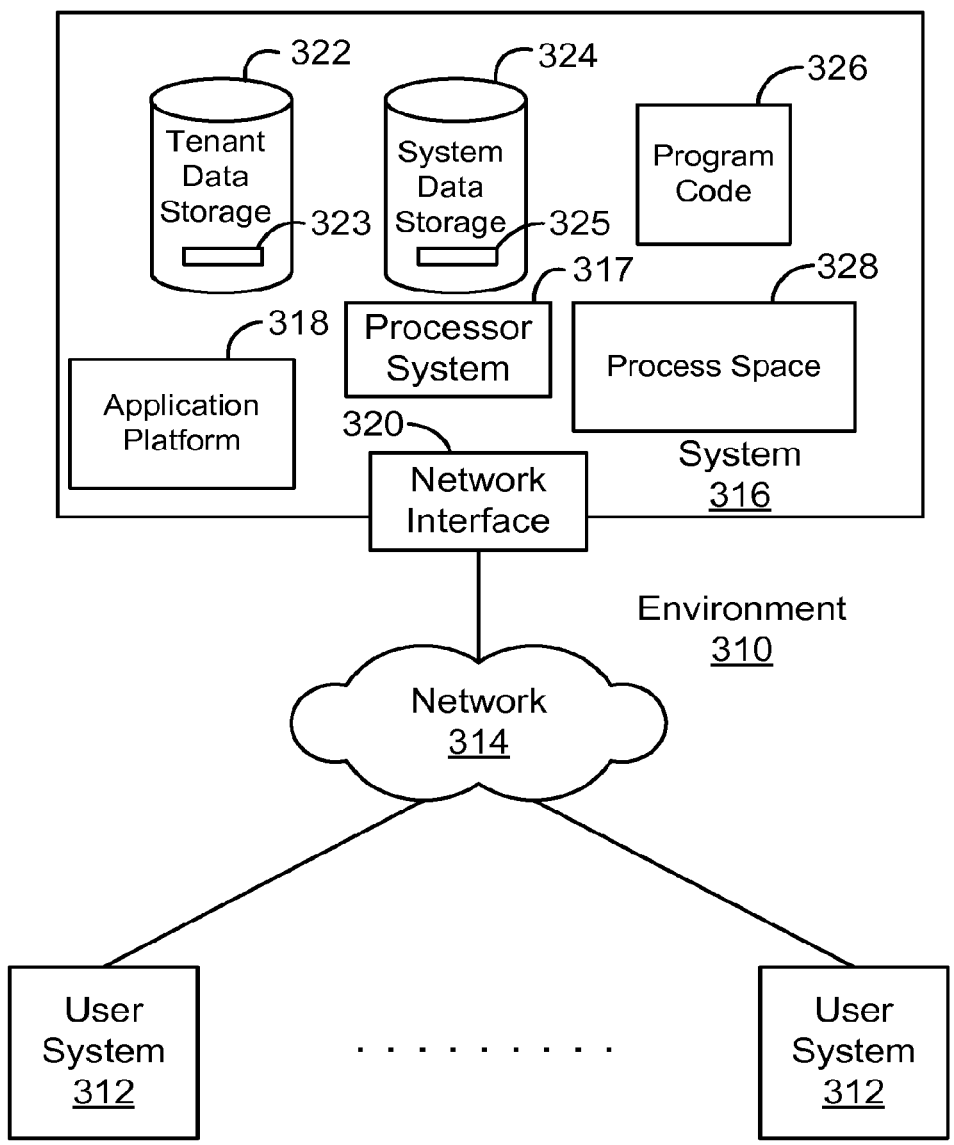
FIG. 3 illustrates a block diagram of an example environment where a database service might be used, and which may be used to implement the embodiments described herein.

FIG. 3 illustrates a block diagram of an example environment 310 where a database service might be used, and which may be used to implement the embodiments described herein. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any test machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316. System 316 may also be referred to as a cloud service provider. System 316 provides its resources to customers (e.g., end users) as a service.

An on-demand database service, such as system 316, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, system 316 may include an application platform 318 that enables creating, managing, and executing one or more applications developed for an on-demand database service, for users accessing the on-demand database service via user systems 312, or for third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User systems 312 might communicate with system 316 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as to provide related data, code, forms, webpages and other information to and from user systems 312. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party application developer) software applications, which may or may not include CRM, may be supported by the application platform 318, which manages the creation and storage of the applications into one or more database objects, and executing of the applications in a virtual machine in the process space of the system 316. The terms "application," "software application," "software package," "software code," and "program code" are used interchangeably.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
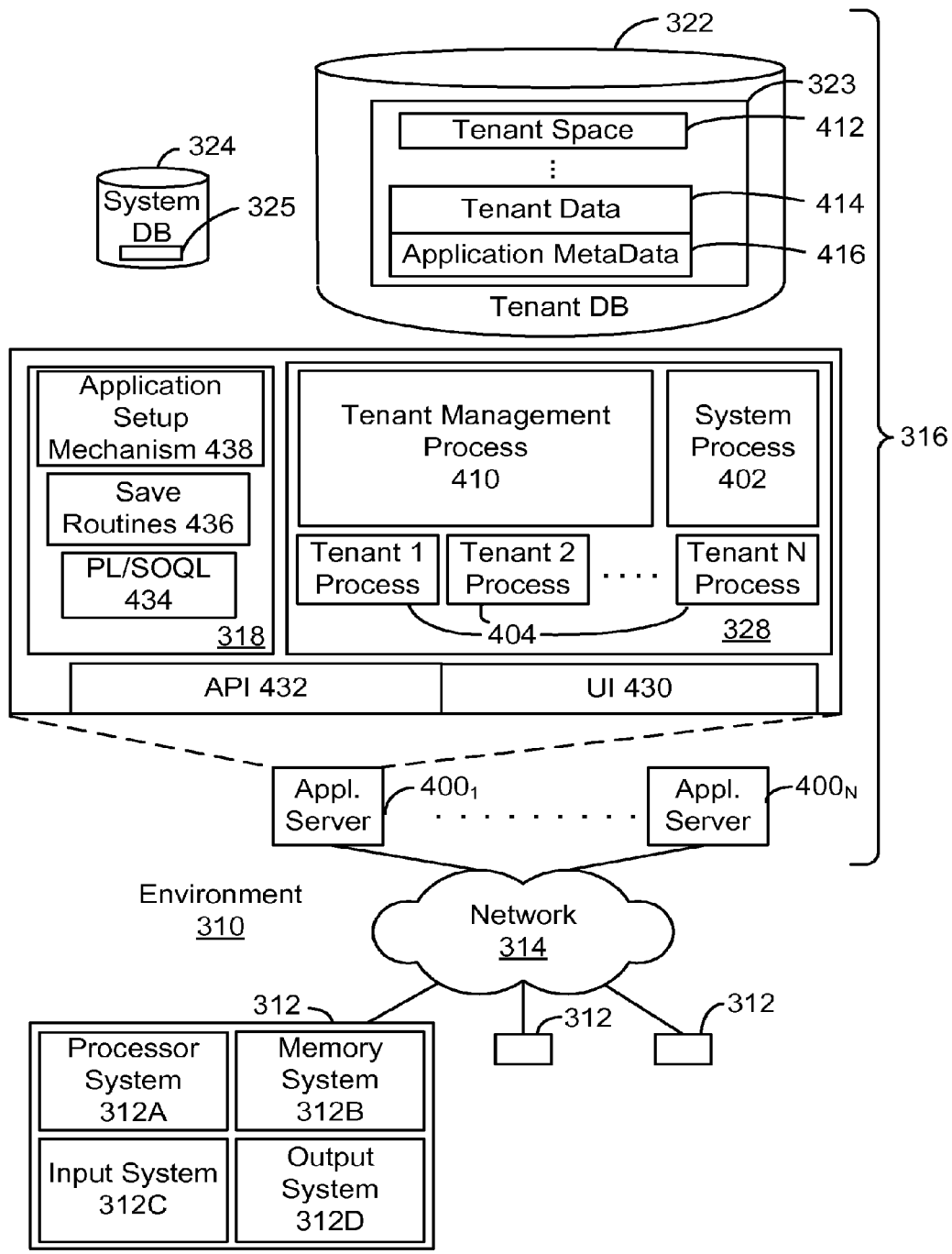
FIG. 4 illustrates a block diagram of another example environment, which may be used to implement the embodiments described herein.

FIG. 4 illustrates a block diagram of another example environment 310, which may be used to implement the embodiments described herein. FIG. 4 also illustrates elements of system 316 and various interconnections, according to one embodiment. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, user interface (UI) 430, application program interface (API) 432, PL/Salesforce.com object query language (PL/SOQL) 434, save routines 436, application setup mechanism 438, applications servers 4001-400N, system process space 402, tenant process spaces 404, tenant management process space 410, tenant storage area 412 (labeled "Tenant Space 412" in FIG. 4), user storage 414 (labeled "Tenant Data 414" in FIG. 4), and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown in FIG. 3, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes and to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410, for example. Invocations to such applications may be coded using PL/SOQL 434 that provides a programming language style interface extension to API 432. Invocations to applications may be detected by one or more system processes, which manage retrieving application metadata 416 for the subscriber, making the invocation and executing the metadata as an application in a virtual machine.

Each application server 400 may be communicably coupled to database systems, e.g., having access to system data 325 and tenant data 323, via a different network connection. For example, one application server 400i might be coupled via the network 314 (e.g., the Internet), another application server 400N-1 might be coupled via a direct network link, and another application server 400N might be coupled by yet a different network connection. Transfer control protocol and Internet protocol (TCP/IP) are typical protocols for communicating between application servers 400 and the database system. However, it will be apparent to one skilled in the art that other transport protocols may be used to optimize the system depending on the network connection used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles the storage of, and access to, different objects, data and applications across disparate users and organizations.

As an example of storage, one tenant might be a company that employs a sales force where each salesperson uses system 316 to manage his or her sales process. Thus, a user might maintain contact data, leads data, customer follow-up data, performance data, goals and progress data, etc., all applicable to that user's personal sales process (e.g., in tenant data storage 322). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more structured query language (SQL) statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While one or more implementations have been described by way of example and in terms of the specific embodiments, it is to be understood that the implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of incrementally updating user features available to users of a shared on-demand database that is shared by multiple users who belong to multiple organizations and who have installed distinct sets of features available from the shared on-demand database, including:
   causing display to a first user of a new feature provisioning interface that allows the first user to select among one or more new features of the shared on-demand database to provision new features to a first user feature set;
   receiving from the new feature provisioning interface a selection of a first new feature of the shared on-demand database to implement using an entity object;
   responsive to the received selection, immediately provisioning the first new feature for the first user, without waiting for a periodic upgrade cycle and without immediately provisioning the first new feature to organizations to which the first user does not belong, including:
   updating layout information to describe a modified presentation layout of the entity object on a display page, based on the first new feature of the shared on-demand database; and
   populating one or more tables of the shared on-demand database with permissions for at least the first user to utilize the updated layout information.

2. The method of claim 1, wherein the first user represents an organization that permits multiple users to share an organization feature set on the shared on-demand database, further including, immediately provisioning the first new feature for the organization represented by the first user, without immediately provisioning the first new feature to other organizations.

3. The method of claim 1, further including, immediately provisioning the first new feature for the first user, without immediately provisioning the first new feature to other users in an organization to which the first user belongs.

4. The method of claim 1, wherein the provisioning of the first new feature further includes updating a database script used to implement the first new feature.

5. The method of claim 1, wherein the provisioning of the first new feature further includes updating field level security parameters for the first user that implement the first new feature.

6. A non-transitory computer readable memory storing instructions that, when executed on a processing unit, cause the processing unit to carry out the method of claim 5.

7. A system including a processing unit and non-transitory computer readable memory, coupled to the processing unit, storing instructions that, when executed on the processing unit, cause the processing unit to carry out the method of claim 5.

8. A non-transitory computer readable memory storing instructions that, when executed on a processing unit, cause the processing unit to carry out the method of claim 1.

9. A system including a processing unit and non-transitory computer readable memory, coupled to the processing unit, storing instructions that, when executed on the processing unit, cause the processing unit to carry out the method of claim 1.

10. A method of incrementally updating user features available to users of a shared on-demand database that is shared by multiple users who belong to multiple organizations and who have installed distinct sets of features available from the shared on-demand database, including:
    causing display to a first user of a new feature provisioning interface that allows the first user to select among one or more new features of the shared on-demand database to provision new features to a first user feature set;
    receiving from the new feature provisioning interface a selection of a first new feature of the shared on-demand database to implement using an entity object; and
    responsive to the received selection, immediately provisioning the first new feature for the first user, without waiting for a periodic upgrade cycle and without immediately provisioning the first new feature to organizations to which the first user does not belong.

11. The method of claim 10, wherein the provisioning of the first new feature further includes:
    updating layout information to describe a modified presentation layout of the entity object on a display page, based on the first new feature of the shared on-demand database.

12. A non-transitory computer readable memory storing instructions that, when executed on a processing unit, cause the processing unit to carry out the method of claim 11.

13. A system including a processing unit and non-transitory computer readable memory, coupled to the processing unit, storing instructions that, when executed on the processing unit, cause the processing unit to carry out the method of claim 11.

14. The method of claim 10, wherein the provisioning of the first new feature further includes:
    populating one or more tables of the shared on-demand database with permissions for at least the first user to utilize updated layout information that describes a modified presentation layout of the entity object on a display page.

15. A non-transitory computer readable memory storing instructions that, when executed on a processing unit, cause the processing unit to carry out the method of claim 14.

16. A system including a processing unit and non-transitory computer readable memory, coupled to the processing unit, storing instructions that, when executed on the processing unit, cause the processing unit to carry out the method of claim 14.

17. A non-transitory computer readable memory storing instructions that, when executed on a processing unit, cause the processing unit to carry out the method of claim 10.

18. A system including a processing unit and non-transitory computer readable memory, coupled to the processing unit, storing instructions that, when executed on the processing unit, cause the processing unit to carry out the method of claim 10.

* * * * *